INVENTORS
BERTRAND L. CHAMBERLAND
DONALD B. ROGERS

BY James H. Ryan

ATTORNEY

United States Patent Office 3,542,697
Patented Nov. 24, 1970

3,542,697
TEMPERATURE SENSITIVE CONDUCTIVE METAL OXIDE MODIFIED VANADIUM DIOXIDES
Bertrand L. Chamberland, Chadds Ford, Pa., and Donald B. Rogers, Wilmington, Del., assignors to E. I. du Pont de Nemours and Company, Wilmington, Del., a corporation of Delaware
Filed June 6, 1968, Ser. No. 735,013
Int. Cl. H01b 1/08
U.S. Cl. 252—518
15 Claims

ABSTRACT OF THE DISCLOSURE

Metal oxide modified vanadium dioxides are prepared by heating a mixture of a metal oxide and a vanadium oxide at temperatures of about 500–1400° C. and at pressures up to 65 kilobars. These metal oxides are temperature-sensitive electrical conductors that are useful as the working element of a temperature-sensitive switch and as a component of a bistable resistor device in a computer storage element.

BACKGROUND OF THE INVENTION

Field of the invention

This invention relates to metal oxide modified vanadium dioxides which are temperature sensitive electrical conductors and to electronic devices using these modified oxides as the working component.

Description of the prior art

Vanadium dioxide, $V_2O_4$, exhibits a structural transformation at 67° C. from a monoclinic form stable at room temperature to a tetragonal, rutile-type structure above the transition. This transformation is accompanied by an abrupt change in several physical properties of $V_2O_4$, including a discontinuous drop in electrical resistivity of about three to four orders of magnitude as the behavior of the material goes from semiconducting to metallic conducting. The transformation is reversible. [J. B. Goodenough, Magnetism and the Chemical Bond, Interscience Monographs of Chemistry, F. A. Cotton ed., vol. 1 (Interscience, John Wiley & Sons, New York, 1963), pp. 272–274; F. Morin, Phys. Rev. Letters 3, 34 (1959)].

The metal oxide modified vanadium oxides of the present invention provide substantial shifts in the temperature of this transformation without significant change in the magnitude and abruptness of the electrical transition.

SUMMARY OF THE INVENTION

This invention is directed to temperature sensitive electrically conductive metal oxides which comprise selective metal oxide modified oxides of vanadium of the formula $$V_{2-x}M_xO_4$$

wherein M is at least one metal selected from ruthenium, iridium, rhodium, rhenium, osmium, indium, thallium, or arsenic and x is 0.005 to 0.2.

The modified oxides of this invention can be prepared by a process which comprises heating under nonoxidizing conditions at a temperature of at least 500° C. and at pressures of up to 65 kilobars (1000 atmospheres is equal to 1 kilobar) the following reactants:

(a) $V_2O_4$ and $MO_2$;
(b) $V_2O_4$, $V_2O_5$ and $M_2O_3$;
(c) $V_2O_5$, $V_2O_3$ and $MO_2$; or
(d) $V_2O_5$, $V_2O_3$ and M, wherein the mixtures of reactants have an atomic ratio of total metal (including vanadium) to oxygen of about 1:2 M is as defined above and the moles of M present is in the range 0.005 to 0.2.

The modified metal oxides of this invention can deviate slightly from the total metal to oxygen ratio of 1:2. It is well known in this art that metal oxides can deviate slightly from exact stoichiometry. See, for example, Wadsley's chapter in Mandelcorn, Non-Stoichiometric Compounds, Academic Press, New York, 1964, pp. 98–209.

The modified metal oxides of this invention are useful as components in temperature sensitive electrical switching devices. Such devices are useful as thermostats for heating or cooling equipment. They are also useful as storage elements in bistable resistor devices.

Details of the invention may be better understood from the remainder of the specification and from the appended drawings in which.

DESCRIPTION OF THE PREFERRED EMBODIMENTS

Figure 1:
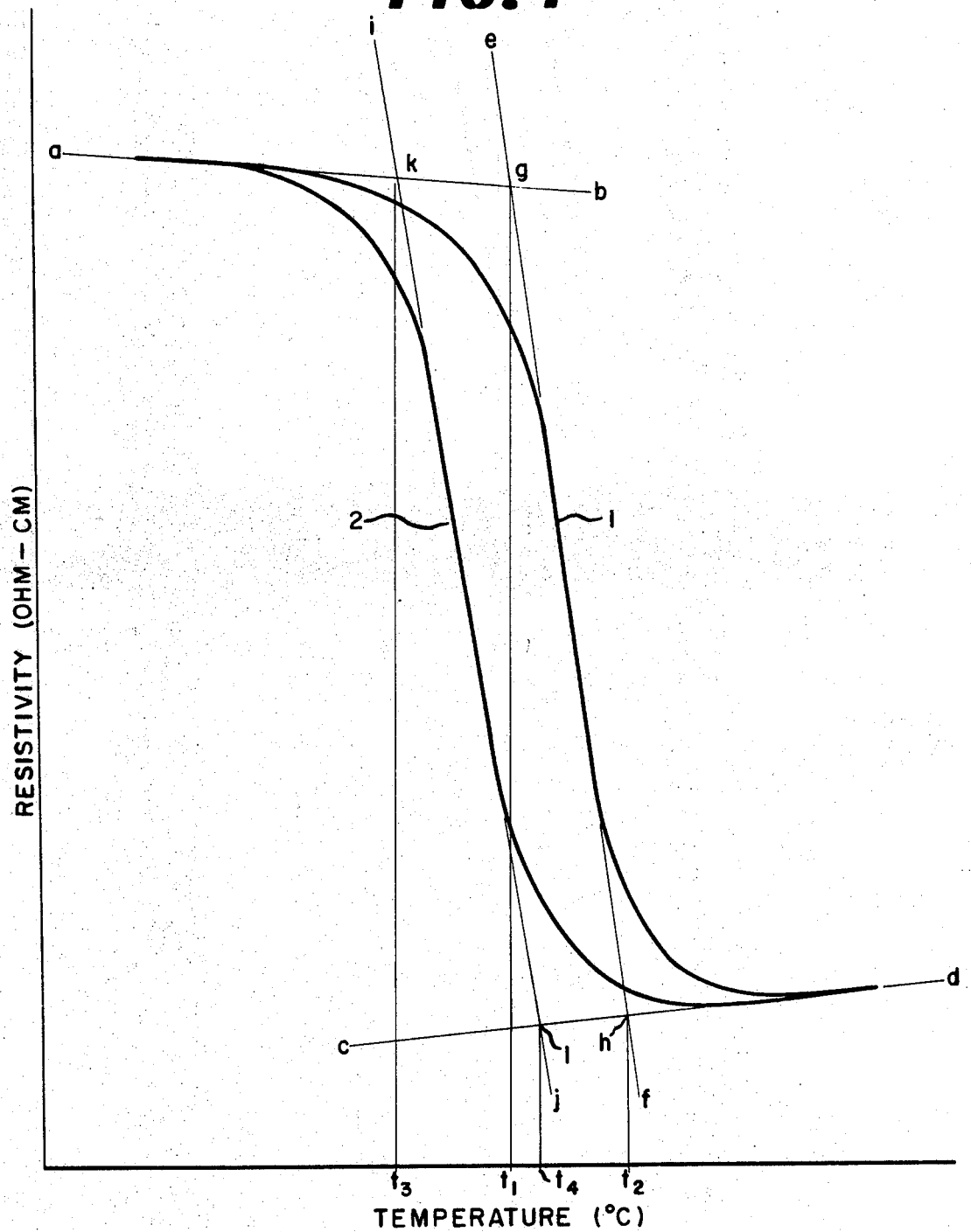
FIG. 1 is a generalized representation of the effect of temperature on the resistivity properties of the compounds of this invention.

The processes of preparing modified $V_2O_4$ can vary greatly. In general, the processes involve direct reaction between stoichiometric quantities of the intimately mixed reactants under nonoxidizing conditions in an inert reaction vessel capable of withstanding the synthesis conditions of elevated temperature and, optionally, externally applied pressure. Reaction temperature is normally in the range 500–1500° C., but can be even higher; external pressure, applied at option, can be 0.001 to 65 kilobars (1000 atmospheres is equal to 1 kilobar), or higher; and reaction times can be 1 to 24 hours, or longer.

For reactions involving autogenous external pressure, the reaction vessel is preferably a heat resistant glass or fused silica tube and in this case the vessel can be evacuated to remove air and sealed. Sealed vessels of other high melting, inert materials, such as platinum, gold, stainless steel and the like, can be similarly used provided that appropriate precautions, such as application of external pressure, evacuation, crimping to expel air, and the like, are taken to prevent vessel rupture due to the development of internal pressure on heating. Reaction can also be effected under an inert gas atmosphere, such as flowing nitrogen or argon. In this case the reaction can be carried out conveniently in a gas-flow combustion tube constructed of an impervious, nonreactive material, e.g., stainless steel, a heat resistant glass, or fused silica. For reactions involving application of external pressure, collapsible vessels, such as thin-walled tubes of platinum, gold, and the like, are preferred. Optionally, reaction can be effected in the presence of a fluxing agent, such as excess $V_2O_5$, in order to promote formation or crystal growth of the desired modified oxide. The excess $V_2O_5$ can subsequently be removed by leaching in a warm (approximately 50 to 65° C.) basic, aqueous solution. Also at option, reaction can be effected under hydrothermal conditions by adding small amounts of $H_2O$ to the reaction mixtures. Under these conditions external pressure is required to prevent vessel rupture.

Solid state reactions of oxides of the modifying meal, M, with vanadium axides are effective in preparing the modified vanadium dioxide compositions. In these syntheses the reactant oxides, for example (a) $V_2O_4$ and $MO_2$, (b) $V_2O_4$, $V_2O_5$, and $M_2O_3$ (c) $V_2O_5$, $V_2O_3$ and $MO_2$, and the like, are intimately mixed, e.g., by grinding or ball milling, and then heated under nonoxidizing conditions in a sealed, evacuated reaction tube or under an inert atmosphere as described above. For convenience, reaction parameters of temperature and time in this embodiment are normally 800–1000° C. and 1 to 24 hours, respectively.

In syntheses under high external pressures, the intimately mixed reactants are heated to 500–1400° C. at a pressure of 20–65 kb., or higher, for a period of a few hours. Pressures of up to 70 kilobars can be developed in a tetrahedral anvil device described in U.S. 3,372,997. Some of the products prepared under these conditions have an orthorhombic-type crystal symmetry. This change of symmetry can reflect some slight deviation from stoichiometry.

The reaction of transition or nontransition metals with vanadium oxides, e.g., $V_2O_4$, $V_2O_5$ and M, or $V_2O_5$, $V_2O_3$, and M, can also lead to modified $V_2O_4$ compositions. In these syntheses the metal, present in a finely divided state, is oxidized by reducing the higher-valent oxides of vanadium, preferably at 800–1000° C., to yield a modified derivative of vanadium dioxide. Similarly, syntheses can be accomplished by the reaction of metal vanadates with $V_2O_4$, preferably at temperatures of 900–1200° C. The reaction of $MVO_4$ and $V_2O_4$ is expressed by the equation:

$$xMVO_4 + (1-x)V_2O_4 \rightarrow V_{2-x}M_xO_4$$

A hydrothermal process for preparing the modified oxides involving synthesis in the presence of water at elevated temperature and pressure can be useful for improving the crystallinity and homogeneity of the modified oxides of this invention. This hydrothermal synthesis is carried out conveniently in the presence of small amounts of water in sealed, thin-walled platinum or gold tubes inserted in a pressure vessel. External pressure, preferably of 2 to 3 kilobars, is applied and reaction is effected within a few hours, preferably at a temperature of 500–700° C. although higher or lower temperatures can be used.

The processes of this invention produce modified oxides which are homogeneous. Good homogeneity is desirable for optimum resolution and magnitude of the reversible transition from conductor to semiconductor. Poor homogeneity can result in more than one apparent transition.

The mixture of metal oxides used in the above processes can be composed of the oxides of metals having oxidation states of +5, +3, +4 and +2. Preferably, the number of equivalent weights present of the metal of oxidation state of +5 is equal to the number of equivalent weights present of the metal of oxidation state of +3 or lower so that the final product will contain a total metal (including vanadium) to oxygen ratio of 1:2. However, slight deviations from this stoichiometric ratio are within the scope of this invention provided that these deviations do not lead to the formation of multiple phases or to the loss of the desired electrical transition. As noted previously, an excess of $V_2O_5$ can be used as a flux to promote reaction or crystal growth. In this case, the reactants contain excess equivalent weight of pentavalent metal oxide. However, this excess is removed after reaction by leaching and the final product again has a total metal to oxygen ratio of approximately 1:2.

Included within the definition of the vanadium modified metal oxides of this invention are modified metal oxides containing 1, 2, 3, 4, 5 or more metal in addition to vanadium. In these cases, $x$ is the sum of moles of modifying metal present. These metal oxides are prepared as described above except that a mixture of the modifying metal oxide or metals is used.

The products of this invention can have either an orthorhombic-, tetragonal- or monoclinic-type crystal structure and exhibit a crystallographic transformation and a corresponding change in electrical properties from metal-like electrical conductor to electrical semiconductor between −70 and 67° C.

FIG. 1 is a generalized representation of the temperature sensitive conductive properties of the oxides of this invention. Curve 1 is a plot of electrical resistivity (in ohm-cm.) of a typical modified metal oxide of this invention versus temperature (° C.) measured with increasing temperature. Curve 2 is a similar plot measured with decreasing temperature. The abruptness of the reversible change in electrical properties from semiconducting to metallic conducting is determined by the intercepts of line $e-f$, drawn tangentially through the inflection point of Curve 1 where resistance changes most rapidly with temperature, with lines $a-b$ and $c-d$, which are extrapolations of the approximately linear oprtions of the curve at temperatures below and above the transition. These intersections of $a-b$ with $e-f$ and $c-d$ with $e-f$ give points $g$ and $h$, which correspond to $t_1$ and $t_2$, respectively, on the temperature scale. The modified metal oxides of this invention show an abrupt change from semiconducting to metallic conducting electrical properties within a temperature range of 10° C. ($t_2$ minus $t_1$ equals 10° C.) or less.

The line $i-j$ is drawn tangentially to the portion of Curve 2 having the greatest change in electrical properties as a function of temperature. The intersections of line $i-j$ with lines $a-b$ and $c-d$ gives points $k$ and $l$, respectively, which correspond to points $t_3$ and $t_4$, respectively. The modified metal oxides of this invention show an abrupt change from metallic conducting to semiconducting electrical properties within a temperature range of 10° C. ($t_4$ minus $t_3$ equals 10° C.) or less. The hysteresis shown by Curves 1 and 2 is approximately represented by the average of the differences $t_2$ minus $t_4$ and $t_1$ minus $t_3$. The hysteresis is 10° C. or less. Small values of hysteresis, e.g., 10° C. or less, is also critical for the use of the oxides of this invention as elements of switching devices.

The hysteresis of a modified $VO_2$ sample can be determined either by electrical or differential thermal measurements. In the first case, the electrical resistivity data obtained by heating and cooling the sample through the transition temperature is used in the manner taught by FIG. 1, where

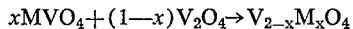

$$H = \frac{(t_2 - t_4) + (t_1 - t_3)}{2}$$

By differential thermal analysis the sample is heated then cooled through the transition temperature at a rate of approximately 1° C. or less per minute. The onset of the endotherm is found experimentally to be equal approximately to $t_1$ while the termination of the endotherm is substantially equal to $t_2$. The onset of the exotherm is found experimentally to be approximately equal to $t_4$ while the termination of the exotherm is substantially equal to $t_3$. Substituting these values into the above formulation it is found that the hysteresis can be determined by DTA to be substantially equal within error to that determined electrically.

Preferably, the magnitude of the reversible change between semiconducting and metallic conducting electrical properties is 1,000 to 10,000 ohm-cm. Compositions having magnitude changes of 10 or more ohm-cm. are operative in the switching devices of this invention, provided that the transition is abrupt.

Figure 2:
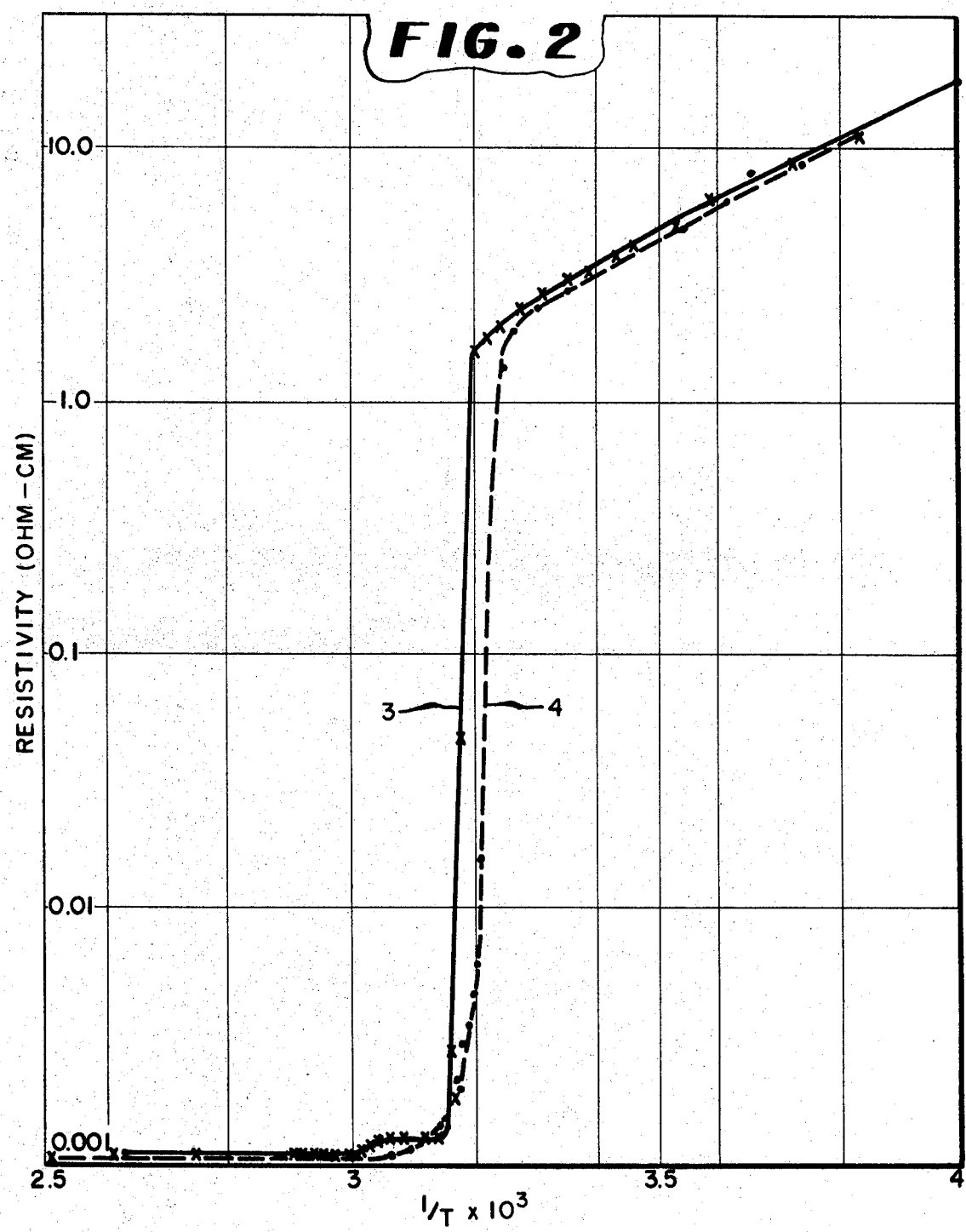
FIG. 2 is the plot of the logarithm of the resistivity of the product produced in Example 2 as a function of the inverse of temperature in degrees Kelvin times $10^3$.

The transition curve for a single crystal of orthorhombic $V_{1.96}Ru_{0.04}O_4$ is shown in FIG. 2, wherein Curve 3 is a plot of electrical resistivity (ohm-cm.) versus the reciprocal of temperature, in degrees Kelvin, times $10^3$. Curve 3 was determined by measuring the resistivity with increasing temperature. Curve 4 is a similar plot measured with decreasing temperature. The abruptness of the transition, as demonstrated by Curves 3 and 4, is less than about 5° C. The hysteresis is about 3.5° C.

The phase transformation can also be observed by differential thermal analysis as the sample is heated or cooled through the critical temperature. Such analysis permits rapid determination of the transition temperature. Furthermore, the resolution of the endothermic or exothermic peak (on heating or cooling, respectively) is a measure of the abruptness.

Applications of the electrical transition of vanadium dioxide in electronic switching devices in computer and other electronic industries have been previously described. [P. F. Bongers and U. Enz., Philips Res. Repts., 21, 387 (1966)]. These applications are limited by the temperature of the transition, and for many uses of electronic switching, a different transition temperature, e.g., that of ordinary room conditions, is highly desirable. It is desirable for the utility of this invention that these metal oxides have an abrupt, easily observable electrical transition. The modified metals oxides of this invention are particularly preferred for this utility because small amounts of the modifying metal produce substantial abrupt shifts of the transition temperature while maintaining a large magnitude of transition.

The following examples further illustrate the invention.

EXAMPLE 1

$V_{2-x}M_xO_4$ (M=Ru, $x$ is about 0.1)

An intimate mixture of 0.788 g. of $V_2O_4$ and 0.067 g. of $RuO_2$ was prepared and then pressed into pellet form. This pellet was placed in a small platinum tube, and the tube was evacuated and sealed while under vacuum. The tube was then heated to 1000° C. under autogenous external pressure for 24 hours, and shlowly cooled to room temperature. The gray, crystalline product was found to be homogeneous by X-ray diffraction analysis. The X-ray reflections were indexed on the basis of a single monoclinic phase. The unit cell volume was larger than that for unmodified $V_2O_4$. A differential thermal analysis (DTA) showed a strong, sharp, reversible endotherm commencing at 50° C., thus, indicating a phase transition and confirming the presence of ruthenium in the oxide.

Using the procedure of Example 1, except that an equivalent molar amount of at least one of the dioxides selected from the group $IrO_2$, $OsO_2$, $ReO_2$, is substituted for the molar amount of $RuO_2$, the corresponding modified compositions of vanadium dioxide having the general formula $V_{2-x}M_xO_4$, where $x$ is about 0.1 and M is selected from at least one of Ir, Os, Re, can be prepared.

EXAMPLE 2

$V_{2-x}M_xO_4$ (M=Ru, $x$=0.02 and .04)

The reaction of $RuO_2$ and $V_2O_4$ in various ratios was studied in a manner described in Example 1. The X-ray diffraction patterns indicated monoclinic symmetry but differential thermal analysis revealed two endotherms indicative of incomplete reaction. The products were then treated at 1200° C. and 60–65 kb. for one hour. Orthorhombic derivatives of ruthenium modified $V_2O_4$ were thus obtained. Electrical data on single crystals of the $V_{1.96}Ru_{.04}O_4$ composition were obtained. A sharp transition at about 39° C. was observed with a 3 power change in resistivity through the transition (FIG. 2). On cooling, the electrical transition was observed to be reversible. The rate of heating and cooling during the measurements of electrical properties was less than one degree per minute. The differential thermal analysis indicated an endotherm at the same temperature as that observed in the electrical resistivity experiment ($T_t=t_1$ in FIG. 1); H signifies the hysteresis in ° C. as obtained in the DTA experiment.

| Reactants | | Products | | |
|---|---|---|---|---|
| $V_2O_4$ | $RuO_2$ | $x$ in $V_{2-x}M_xO_4$ | $T_t$ (° C.) | H ° (C.) |
| .821 | .013 | .02 | 55 | 2.5 |
| .813 | .027 | .04 | 39 | .3.7 |

This example also demonstrates that as the ruthenium ion concentration is increased the transition temperature decreases.

EXAMPLE 3

$V_{2-x}M_xO_4$ (M=Ru, $x$=0.01)

A mixture of 0.10 g. of Ru metal powder, 1.82 g. of $V_2O_3$ and 1.50 g. of $V_2O_5$ was prepared and sealed in an evacuated gold tube. The tube was heated to 900° C. with application of 125 atm. external pressure for 6 hours in a pressure vessel and then slowly cooled at a rate of approximately 30° per hour to room temperature. The tube contained a homogeneous black powder. The product was analyzed by DTA and found to exhibit a sharp endotherm at about 62° C.

EXAMPLE 4

$V_{2-x}M_xO_4$ (M=Ru, $x$=0.06)

The reaction of .05 g. of Ru powder, 0.75 g. of $V_2O_3$ and 2.00 g. of $V_2O_5$ (an excess of the pentoxide) in a sealed gold tube as described in Example 3 yielded ruthenium-modified vanadium dioxide as small crystals having a particle diameter of about 1.0 mm. The excess $V_2O_5$, used as a flux to grow single crystals, was removed by treating the product with a $NH_4OH$-solution. The ruthenium derivative exhibited an endotherm at 25° C. by differential thermal analysis indicating considerable substitution of ruthenium for vanadium in the resulting product.

Similarly, other metals such as In, Rh, Ir, and Re react with a mixture of vanadium oxides to yield a modified vanadium dioxide with a corresponding decrease in the crystallographic transition temperature as compared to that of pure vanadium dioxide.

EXAMPLE 5

$V_{2-x}M_xO_4$ (M=Ir, $x$=0.02 and 0.04)

The reaction of various amounts of $IrO_2$ and $V_2O_4$ was conducted by heating pellets of the intimately mixed oxides in sealed, evacuated, platinum tubes to 1000° C. for 24 hours under autogenous pressure. The homogeneous, monoclinic-type products were found to be modified derivatives of $V_2O_4$ by differential thermal analyses.

The products were also subjected to further heat treatment at 1400° C. and 60–65 kb. for 2 hours. These high-pressure products were also found to have monoclinic symmetry and had characteristics similar to those obtained under autogenous pressure conditions. The following table describes the products where $T_t$ corresponds to $t_1$ in FIG. 1 and H is the hysteresis determined by differential thermal analysis at a heating or cooling rate of less than 1° C. per minute.

| Reactants | | | Products | | |
|---|---|---|---|---|---|
| | | | $T_t$ (° C.) | | H (° C.) |
| $IrO_2$ | $V_2O_4$ | $x$ in $V_{2-x}M_xO_4$ | Autogenous pressure | High pressure | high pressure |
| 0.022 | 0.821 | 0.02 | 63 | 65 | 6.7 |
| 0.045 | 0.813 | 0.04 | 60 | 61 | 2.0 |

EXAMPLE 6

$V_{2-x}M_xO_4$ (M=As, $x$=0.2)

The hydrothermal reaction of $V_2O_4$ and equivalent amounts of $V_2O_5$ and arsenic sesquioxide for 17 hours at 700° C. and 3000 atm. yielded a black crystalline product having a monoclinic crystalline structure. Evidence for the introduction of arsenic in the vanadium dioxide was obtained by differential thermal analysis of the product, which revealed a shift of the transition temperature to 60° C. The transition temperature range was abrupt.

This example demonstrates the preparation of modified $V_2O_4$ derivatives by the hydrothermal synthesis route. Various transition metal oxides or oxides of In, Tl, or As can react with a mixture of vanadium oxides or pure vanadium dioxide under similar hydrothermal conditions.

The modified metal oxides listed in the right-hand column of the table given below can be prepared by heating an intimate mixture of the amount of the modifying metal oxide or mixtures thereof listed in the left-hand column of the table with the amount of the vanadium oxide listed in the middle column of the table. The heating is conducted in a platinum boat at a temperature of 1000° C. under oxygen-free argon for twelve hours. The black microcrystalline modified oxides produced show a lower shift in the transition temperature from that observed for $V_2O_4$.

| Modifying metal oxide | | Vanadium oxide | | |
|---|---|---|---|---|
| Metal oxide | Moles | Oxide | Moles | Modified metal oxide |
| $IrO_2$ | 0.005 | $V_2O_4$ | 0.9975 | $V_{1.995}Ir_{0.005}O_4$ |
| $IrO_2$ | 0.02 | $V_2O_4$ | 0.99 | $V_{1.98}Ir_{0.02}O_4$ |
| $IrO_2$ | 0.1 | $V_2O_4$ | 0.95 | $V_{1.9}Ir_{0.1}O_4$ |
| $IrO_2$ | 0.2 | $V_2O_4$ | 0.9 | $V_{1.8}Ir_{0.2}O_4$ |
| $Rh_2O_3$ | 0.005 | $V_2O_5$ plus $V_2O_4$ | 0.005 / 0.99 | $V_{1.99}Rh_{0.01}O_4$ |
| $Rh_2O_3$ | 0.05 | $V_2O_5$ plus $V_2O_4$ | 0.05 / 0.9 | $V_{1.9}Rh_{0.1}O_4$ |
| $ReO_2$ | 0.005 | $V_2O_4$ | 0.9975 | $V_{1.995}Re_{0.005}O_4$ |
| $ReO_2$ | 0.02 | $V_2O_4$ | 0.99 | $V_{1.98}Re_{0.02}O_4$ |
| $ReO_2$ | 0.1 | $V_2O_4$ | 0.95 | $V_{1.9}Re_{0.1}O_4$ |
| $ReO_2$ | 0.2 | $V_2O_4$ | 0.9 | $V_{1.8}Re_{0.2}O_4$ |
| $OsO_2$ | 0.005 | $V_2O_4$ | 0.9975 | $V_{1.995}Os_{0.005}O_4$ |
| $OsO_2$ | 0.02 | $V_2O_4$ | 0.99 | $V_{1.98}Os_{0.02}O_4$ |
| $OsO_2$ | 0.1 | $V_2O_4$ | 0.95 | $V_{1.9}Os_{0.1}O_4$ |
| $OsO_2$ | 0.2 | $V_2O_4$ | 0.9 | $V_{1.8}Os_{0.2}O_4$ |
| $RuO_2$ plus $IrO_2$ | 0.1 / 0.1 | $V_2O_4$ | 0.9 | $V_{1.8}Ru_{0.1}Ir_{0.1}O_4$ |
| $RuO_2$ plus $ReO_2$ | 0.15 / 0.05 | $V_2O_4$ | 0.9 | $V_{1.8}Ru_{0.15}Re_{0.05}O_4$ |
| $Rh_2O_3$ plus $As_2O_5$ | 0.05 / 0.05 | $V_2O_4$ | 0.9 | $V_{1.8}Rh_{0.1}As_{0.1}O_4$ |
| $Tl_2O_3$ | 0.01 | $V_2O_5$ plus $V_2O_4$ | 0.01 / 0.98 | $V_{1.98}Tl_{0.02}O_4$ |
| $In_2O_3$ | 0.0025 | $V_2O_4$ plus $V_2O_5$ | 0.995 / 0.0025 | $V_{1.995}In_{0.005}O_4$ |
| $In_2O_3$ | 0.005 | $V_2O_4$ plus $V_2O_5$ | 0.99 / 0.005 | $V_{1.99}In_{0.01}O_4$ |
| $In_2O_3$ | 0.05 | $V_2O_4$ plus $V_2O_5$ | 0.9 / 0.05 | $V_{1.9}In_{0.1}O_4$ |
| $In_2O_3$ | 0.075 | $V_2O_4$ plus $V_2O_5$ | 0.85 / 0.075 | $V_{1.85}In_{0.15}O_4$ |
| $Tl_2O_3$ | 0.0025 | $V_2O_4$ plus $V_2O_5$ | 0.995 / 0.0025 | $V_{1.995}Tl_{0.005}O_4$ |
| $Tl_2O_3$ | 0.005 | $V_2O_4$ plus $V_2O_5$ | 0.99 / 0.005 | $V_{1.99}Tl_{0.01}O_4$ |
| $Tl_2O_3$ | 0.05 | $V_2O_4$ plus $V_2O_5$ | 0.9 / 0.05 | $V_{1.9}Tl_{0.1}O_4$ |
| $Tl_2O_3$ | 0.075 | $V_2O_4$ plus $V_2O_5$ | 0.85 / 0.075 | $V_{1.85}Tl_{0.15}O_4$ |
| $As_2O_3$ | 0.0025 | $V_2O_4$ plus $V_2O_5$ | 0.995 / 0.0025 | $V_{1.995}As_{0.005}O_4$ |
| $As_2O_3$ | 0.005 | $V_2O_4$ plus $V_2O_5$ | 0.99 / 0.005 | $V_{1.99}As_{0.01}O_4$ |
| $As_2O_3$ | 0.05 | $V_2O_4$ plus $V_2O_5$ | 0.9 / 0.05 | $V_{1.9}As_{0.1}O_4$ |
| $As_2O_3$ | 0.075 | $V_2O_4$ plus $V_2O_5$ | 0.85 / 0.075 | $V_{1.85}As_{0.15}O_4$ |

All the modified metal oxides of this invention are useful as components of devices for use in electronic circuitry. For example, the modified metal oxides can be used as the working or active element of a temperature activated, or temperature sensitive, switching device such as a thermostat. Such devices are useful for actuating fire alarms or for controlling automatic fire sprinklers. Preferably, for this utility, the modified oxides have a transition temperature in the temperature range of 50–65° C. For temperature control nearer room conditions, e.g., for comfort or for control of a constant temperature bath near ambient conditions, a transition in the temperature range 20–40° C. is preferred. A switching device can be made from a modified metal oxide in the form of a sintered plug or rod, a crystal or a thin film. Electrical contact wires or leads are connected to form an electrical contact with the plug, crystal or thin film.

Figure 3:
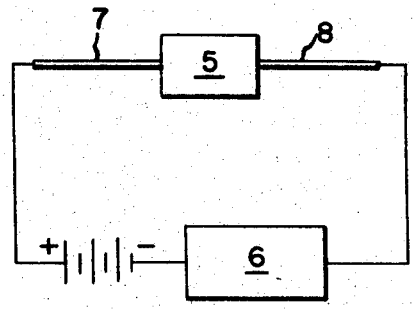
FIG. 3 is a sketch of an electrical circuit showing an embodiment of this invention.

This utility is further illustrated in FIG. 3, where 5 is an oxide of this invention in the form of a plug, crystal or thin film and 7 and 8 are leads connected to the plug, crystal or thin film of the modified oxide. In FIG. 3, 6 represents a fire alarm or sprinkler that is activated by an electric current. The electric circuit is closed by a rise in the temperature of the area controlled to a temperature above the transition point. At that point the modified oxide becomes a metallic conductor, the circuit is closed and the alarm or sprinkler is activated.

The temperature sensitive switch can be used as a bi-stable resistor element, i.e., a device that has a stable high-current state and a stable low-current state at constant applied voltage. Such a bistable resistor device has utility as a storage element for computers. [P. F. Bongers and U. Enz., Philips Res. Repts. 21, 387 (1966).]

A plug for the above uses is formed by pressing one of the modified oxides in the form of a finely divided powder with or without a binder, in a mold at pressures of about 50,000 p.s.i. followed by sintering at temperatures of the order of 500° C. Crystals that are formed in the process of this invention can be used directly in this application. Thin films (500–4000 A in thickness) of these oxides can be produced by use of a "sputtering" technique as described for unmodified $VO_2$ by G. A. Rozgonyi et al., Appl. Phys. Letters, 8, 220 (1966) or E. N. Fuls, et al., ibid, 10, 199 (1967), and the post-deposition treatment described by G. A. Rozgonyi et al., J. Electro. Chem. Soc., 115, 56 (1968).

The preparation of thin films of the modified oxide of this invention can be accomplished by a reactive sputtering technique comprising the use of an alloy consisting of vanadium and the modifying element, M, where M is as defined above. The operation can be carried out in a standard DC sputtering apparatus capable of operation at low pressures with the desired alloy as the cathode. Initially the apparatus is evacuated ($10^{-5}$ to $10^{-8}$ torr) in order to remove traces of undesired gases or other volatile material and then a mixture of argon-oxygen (1–3% oxygen) is admitted to a final pressure of about $10^{-2}$ to $10^{-1}$ torr. On application of a DC voltage greater than about 400 v. the alloy is sputtered and partially oxidized by the active oxygen atmosphere onto a suitable substrate-e.g., a wafer or sapphire or rutile, that is maintained at a temperature of 500° C. or lower. The operation results in a film of metal-modified vanadium oxides that must be post-treated to obtain the proper oxygen to metal ratio of about 2:1. The post-deposition treatment described by Rozgonyi, et al., for thin films of $VO_2$ is also convenient for the modified oxides of this invention and consists merely of annealing the deposited film in water vapor.

Figure 4:
FIG. 4 is a side view of an electrical switching device of this invention.

FIG. 4 shows the thin film embodiment of this invention. In FIG. 4, the thin film of an oxide of this invention 9, is coated on a substrate 12, and leads 10 and 11 are in electrical contact with the thin film.

The foregoing detailed description has been given for clarity of understanding only and no unnecessary limitations are to be understood therefrom. The invention is not limited to the exact details shown and described for obvious modifications will be apparent to those skilled in the art.

The embodiment of the invention in which an exclusive property or privilege is claimed are defined as follows:
1. A temperature sensitive electrically conductive metal oxide modified vanadium dioxide of formula $$V_{2-x}M_xO_4$$

wherein M is at least one metal selected from ruthenium, iridium, rhodium, rhenium, osmium, indium, thallium or arsenic and $x$ is 0.005 to 0.2.
2. The oxide of claim 1 wherein M is Ru.
3. The oxide of claim 1 wherein is Re.
4. The oxide of claim 1 wherein M is Ir.
5. The oxide of claim 1 wherein M is As.
6. The oxide of claim 1 wherein M is Ru and $x$ is 0.1.
7. The oxide of claim 1 wherein M is Ru and $x$ is 0.02.
8. The oxide of claim 1 wherein M is Ru and $x$ is 0.04.
9. The oxide of claim 1 wherein M is Ru and $x$ is 0.01.
10. The oxide of claim 1 wherein M is Ru and $x$ is 0.06.
11. The oxide of claim 1 wherein M is Ir and $x$ is 0.02.
12. The oxide of claim 1 wherein M is Ir and $x$ is 0.04.
13. The oxide of claim 1 wherein M is As and $x$ is 0.2.
14. A process for preparing a modified metal oxide of claim 1 that comprises heating at temperatures of 500–1400° C. and at pressures up to 65 kilobars, a mixture of selected reactants from the group consisting of
(a) $V_2O_4$ and $MO_2$;
(b) $V_2O_4$, $V_2O_5$ and $M_2O_3$;
(c) $V_2O_5$, $V_2O_3$ and M;
(d) $V_2O_5$, $V_2O_3$ and $MO_2$; and (e) $V_2O_4$ and $MVO_4$ wherein M is defined in claim 1 where the reactants have an atomic ratio of total metal to oxygen of 1:2 and the total moles of M present is in the range 0.005 to 0.2.
15. A temperature sensitive switch containing a modified metal oxide of claim 1.

References Cited

UNITED STATES PATENTS 3,402,131  9/1968  Futaki et al. _____ 252—518

OTHER REFERENCES

Chemical Abstracts, vol. 65, 16218a.

DOUGLAS J. DRUMMOND, Primary Examiner

U.S. Cl. X.R.

23—51